May 9, 1967 A. J. SCALZO 3,318,572
ELASTIC FLUID POWER PLANT APPARATUS
Filed March 9, 1965 3 Sheets-Sheet 1

May 9, 1967  A. J. SCALZO  3,318,572
ELASTIC FLUID POWER PLANT APPARATUS
Filed March 9, 1965  3 Sheets-Sheet 3

United States Patent Office 3,318,572
Patented May 9, 1967

3,318,572
ELASTIC FLUID POWER PLANT APPARATUS
Augustine J. Scaizo, Philadelphia, Pa., assignor to Westinghouse Electric Corporation, Pittsburgh, Pa., a corporation of Pennsylvania
Filed Mar. 9, 1965, Ser. No. 438,270
8 Claims. (Cl. 253—39)

This invention relates to a housing structure for an elastic fluid utilizing machine having a rotor supported therein, such as a turbine, and has for an object to provide an improved structure of this type.

In gas turbine power plants, for example, the turbine end portion of the rotor is supported by a rear bearing disposed downstream of the turbine. With this arrangement, the rear bearing and its supporting structure are disposed near the path of hot motive fluid exhausted from the turbine, and are thus subjected to extremely high temperatures. Accordingly, the rear bearing is disposed within the inner shell and supported by the outer shell of the power plant by a plurality of tangential struts that extend across the annular flow passage of the motive fluid. Tangential strut arrangements of this type are shown in Kenney Patent No. 2,724,621 and Mierley Patent No. 2,616,662, both of which are assigned to the same assignee as this invention.

During operation, since the shell and strut structure is symmetrical, the tangential struts are effective to maintain the bearing in proper concentric position. That is, as the struts undergo relative expansion or contraction due to the differential temperatures attained in the structure, they end to rotate the bearing retaining structure. Resistance to rotation of the bearing retaining structure is provided by the torsional restraint of the structure.

When the shell structure includes an exhaust housing disposed in communication with the motive fluid passageway and connected to the inner and outer shell structure, the additional torsional restraint imposed by the exhaust housing against the above rotation can be so great that buckling of the struts will occur.

It is a further object of the invention to provide, in a turbine shell structure having tangential strut members to support the rotor bearing retainer and an exhaust housing for directing the motive fluid from the shell structure, an arrangement for connecting the housing to the shell structure in a manner to adequately support the housing and the fluid pressure loads imposed thereon, yet imposing little additional torsional restraint to rotation of the bearing retainer by the struts.

Another object of the invention is to provide an arrangement for connecting an exhaust housing to an inner and outer concentric shell structure subject to expansion by hot motive fluids, in which leakage of such fluid through the connection between the shell structure and the housing is minimized, yet little restraint is imposed tending to oppose such expansion.

Briefly, in accordance with the invention, there is provided in a gas turbine power plant, for example, inner and outer concentric shell structure jointly defining a motive gas flow passageway, and a turbine rotor structure having blading extending across the passageway and motivated by the gases. The rotor is supported for rotation by a suitable bearing structure disposed in a retainer and the retainer is supported by a plurality of tangentially arranged struts extending between the retainer and the outer shell.

An exhaust housing of generally toroidal shape but having an exhaust outlet is rigidly connected to the outer shell and extends across the gas flow passageway into juxtaposition with the inner shell. The inner shell is firmly but flexibly connected to the exhaust casing by an annular array of spaced members flexible in circumferential direction, i.e. having torsional flexibility, but stiff in axial and radial directions, thereby to provide adequate support for the housing but imposing little torsional restraint on the tangential struts.

Accordingly, during operation, the inner cylinder and/ or bearing retainer are free to rotate, as dictated by the relative elongation of the tangential struts, yet the exhaust housing fluid pressure and weight loads are adequately assumed by the inner and outer shells. A suitable annular sliding seal is preferably provided between the inner shell and the exhaust casing to minimize leakage of gases therepast.

The above and the objects are effected by the invention as will be apparent from the following description and claims taken in connection with the accompanying drawings, forming a part of this application, in which:

Figure 1:
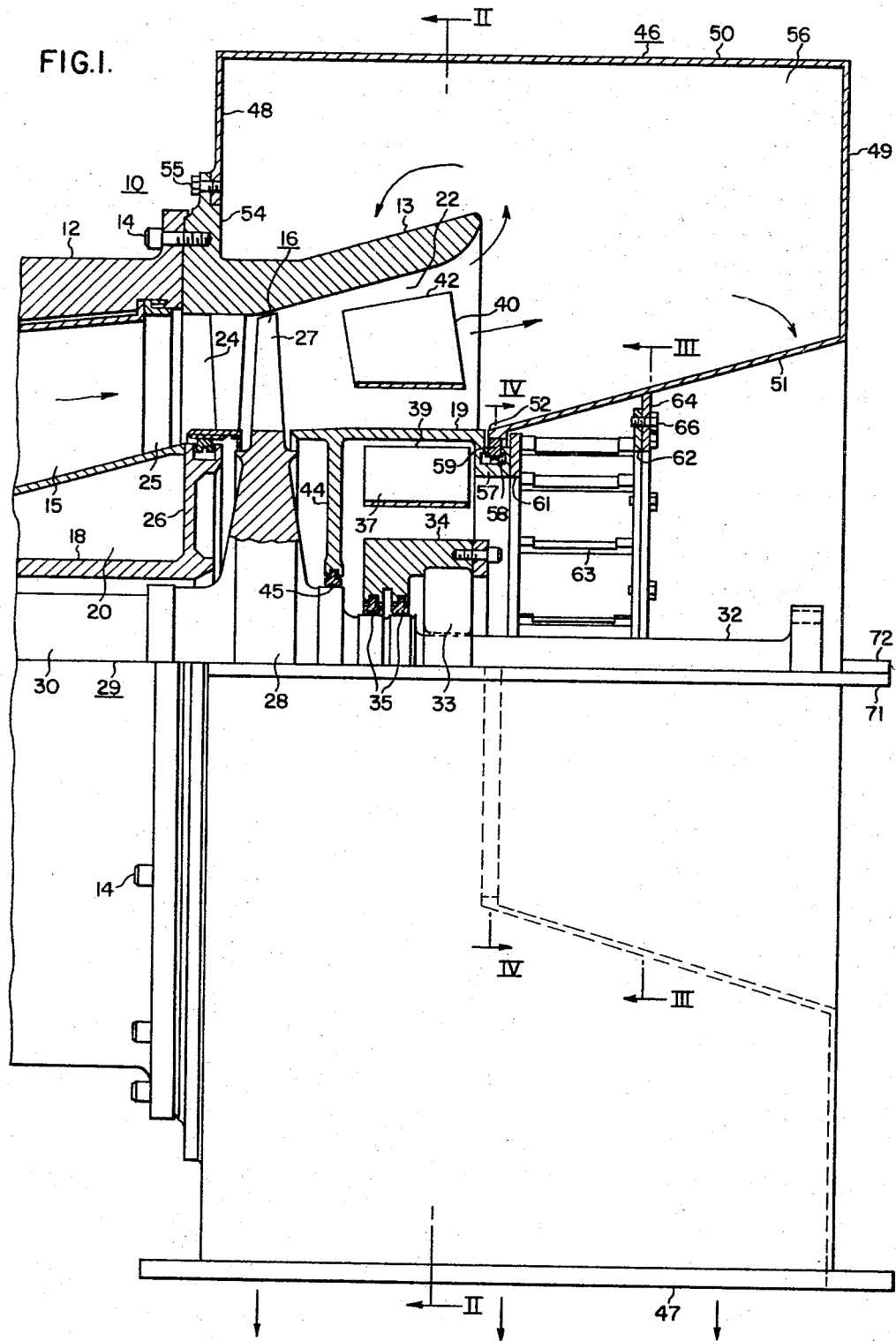
FIGURE 1 is a longitudinal view of the rear portion of a gas turbine power plant incorporating the invention, the upper half portion being shown in radial section and the lower half portion being shown in elevation.

Referring to the drawings in detail, in FIG. 1, only the rear portion 10 of a gas turbine power plant has been shown, since this is the portion associated with the invention and since gas turbine power plants of the type illustrated are generally well known.

The gas turbine power plant portion 10 generally comprises an outer tubular shell structure 12, 13 joined together by an annular array of bolts 14 and encompassing fuel combustion chamber structure 15 of any suitable type (only partially shown), turbine structure 16 and inner tubular shell structure 18, 19 concentric with the outer shell structure 12, 13.

The inner and outer shell structure 18 and 12 jointly define an annular space 20 within which the combustion chamber 15 is disposed and the inner and outer shell structure 19 and 13 jointly define an annular passageway 22 for flow of hot motive fluid from the combustion chamber 15.

The turbine structure 16 includes an annular array of nozzle blades 24 disposed within the outer shell 13 and in registry with the outlet 25 of the fuel combustion structure 15. The nozzle blade structure 24 is connected to the inner shell structure 18 by an annular flange portion 26 formed integrally with the inner shell structure 18. The turbine structure 16 further includes an annular row of rotatable blades 27 mounted upon a rotor disc 28 forming a portion of the rotor spindle structure generally designated 29.

The rotor spindle structure 29 includes a connecting shaft portion 30 for driving the usually supplied air compressor (not shown) disposed at the forward end of the gas turbine power plant and a rearwardly extending shaft portion 32 usually termed the output power shaft and employed for driving any suitable load (not shown). The rotor structure 29 is rotatably supported in a region within the inner shell structure 19 by a suitable bearing 33 which in turn is held by a bearing retainer of annular shape 34.

Figure 2:
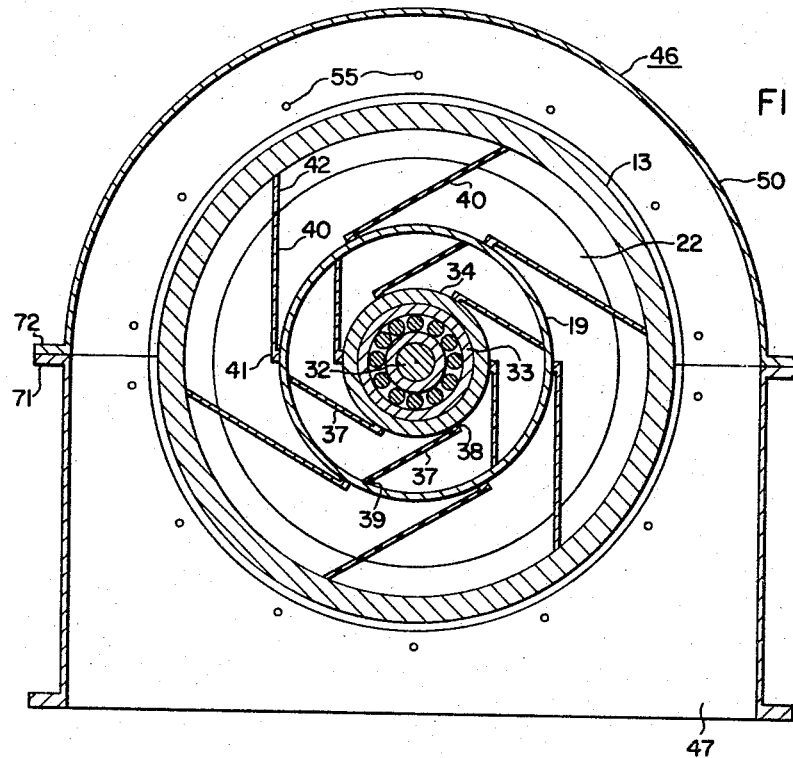
FIG. 2 is a cross-sectional view, on a smaller scale, taken on line II—II of FIG. 1.
Figure 3:
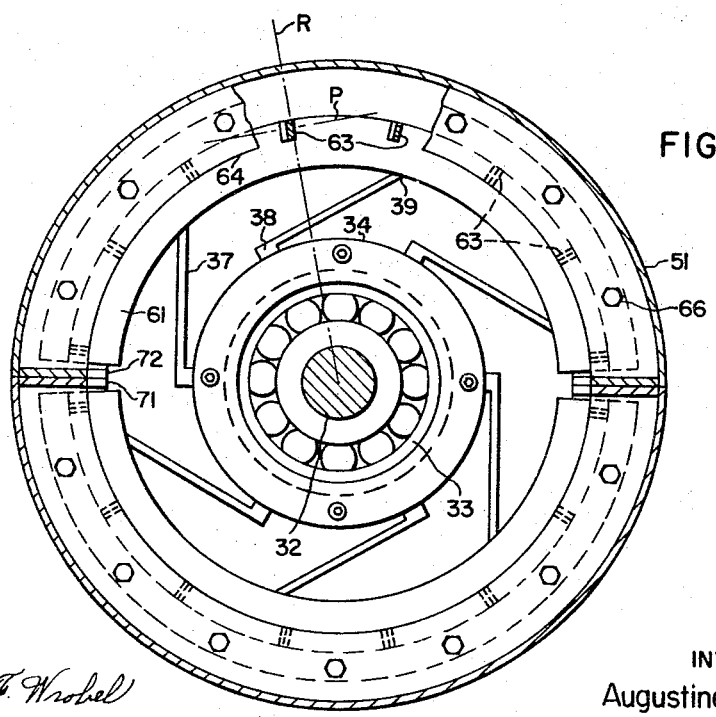
FIG. 3 is a cross-sectional view taken on line III—III of FIG. 1.

The bearing retainer member 34 further includes a plurality of suitable annular seals 35 for minimizing leakage of motive fluid therepast to the atmosphere, in a manner well known in the art. The bearing retainer 34, as also shown in FIGS. 2 and 3, is supported in concentric relation with the inner shell structure 19 by an annular array of strut members 37 connected at their inner ends to the outer surface of the retainer 34 in a tangential manner and at their outer ends to the inner shell structure 19, as indicated at 38 and 39, respectively.

In a similar manner, the inner shell structure 19 is supported by the outer shell structure 13 and an annular array of strut members 40 are provided for this purpose. The struts 40 are also connected to the inner shell structure 19 in a tangential manner at one end and at their opposite end they are attached to the outer shell structure 13, as indicated at 41 and 42, respectively.

The inner shell structure 19 is further provided with an annular flange portion 44 extending in radially inwardly direction and provided with a suitable annular seal structure 45 cooperating with the rotor disc 28 to minimize the leakage flow of the hot motive fluid from the flow passageway 22 therepast to atmosphere. Accordingly, the bearing 33, the bearing retainer structure 34 and the tangential strut members 37 are protected against heating by flow of the high temperature gases therepast. Nevertheless, they are unavoidably subjected to some heating by conduction and radiation effects of the gas flow in the passageway 22.

The tangential strut members 40 however are subjected to considerably higher heating effects, since they are directly disposed in the gas flow passageway 22. Hence, as well known in the art, it will now be apparent that the strut members 37, as well as the strut members 40, are subject to thermoelongation during operation and are also subject to thermal stresses induced thereon by the differential thermal expansion of the inner and outer shell structures 19 and 13.

As thus far described, the structure 10 is substantially conventional and well known in the art and operates in the following manner. As the rotor spindle 29 is rotated about its central axis, the air compressor (not shown) is effective to induce and pressurize air and direct it to the fuel combustion structure 15, wherein a combustion process is maintained by injection of fuel in a suitable manner (not shown) to provide a continuous flow of hot combustion gases that serve as motive fluid, and this motive fluid is directed through the outlet 25 of the combustion apparatus 15 and past the nozzle blades 24 to the rotor blades 27, thereby motivating the rotor disc 28 to sustain rotation of the rotor spindle 29 and the compressor (not shown). The thus expanded hot motive fluid is then directed through the annular flow passageway 22 and ejected from the outer shell structure 13, after passing over and around the tangential struts 40.

As the tangential struts 40 and the inner and outer shell structures 19 and 13, respectively, become heated, the resulting elongation of the tangential struts 40 will tend to rotate the inner shell structure 19, while still maintaining it in concentric relation with the rotational axis of the rotor spindle 29. Accordingly, since the inner shell structure 19 supports the bearing retainer 34, the bearing retainer 34 will also tend to be rotated therewith while still maintaining the bearing 33 in properly centered position.

In a similar manner, the tangential strut members 37 will tend to elongate, due to the above described heating effects, and as they elongate they will tend to further rotate the bearing retainer 34 in a concentric manner. Since the above described structure is substantially symmetrical about the rotational axis of the rotor spindle structure 29, substantially pure rotation of the inner shell structure 19 and bearing retainer 34 is attained. Also, as thus far described, the only resistance to the above described rotation results from the torsional restraint of the components in the above structure since the inner shell is supported by the outer shell. Should the torsional restraint be sufficiently high, buckling of the struts would then occur.

In accordance with the invention, the hot motive fluid exhausted from the fluid flow passageway 22 is directed through an exhaust housing structure 46 of generally toroidal shape but having a motive fluid exhaust outlet 47 for directing the fluid to the atmosphere. The exhaust housing structure 46 includes a forwardly disposed annular wall portion 48, a rearwardly disposed wall portion 49 of annular shape disposed in rearwardly spaced relation with the forward wall portion 48, a peripheral wall portion 50 of generally inverted U-shape, as best seen in FIG. 2, and a frusto-conical wall portion 51 connected to the rear wall 49 and extending towards the inner shell structure 19. The forward annular end portion 52 of the wall portion 51 is disposed in registry with the inner shell structure 19.

The exhaust housing structure 46 is supported at its forward end portion by the outer shell structure 13 and is connected thereto by a suitable annular flange structure 54 formed integrally with the outer shell structure 13 and rigidly attached to the forward wall portion 48 in any suitable manner, for example, by an annular array of suitable bolts 55. The exhaust housing structure 46 and the outer shell structure 13 jointly define an annular exhaust fluid chamber 56 that communicates with the exhaust outlet 47 of the exhaust housing.

The exhaust housing 46 is also attached to the inner shell structure 19 in a manner, now to be described, which minimizes leakage flow of the motive fluid through the juxtaposed portions of the inner shell structure 19 and the end portion 52 of the exhaust housing wall 51, while imposing low additional torsional restraint upon rotation of the inner shell structure 19 by the tangential struts 40, during operation, so that the struts 40 are free to change in length during operation and to rotate the inner shell structure 19, as required, without buckling or distortion.

The downstream portion of the inner shell structure 19 (with respect to direction of flow of motive fluid) is provided with an annular end wall portion 57 concentric with the rotational axis of the rotor spindle structure 29 and forming an annular groove 58. Within the groove 58 there is provided an annular series of arcuate shoes or sealing members 59. The shoes 59 are biased in radially outwardly direction into sealing relation with the end portion 52 of the exhaust housing wall 51 by a plurality of flat springs 60, thereby permitting the shell structure 19 to rotate relative to the exhaust housing wall 51 with only minimal friction and therefore a minimum of torsional restraint.

Figure 5:
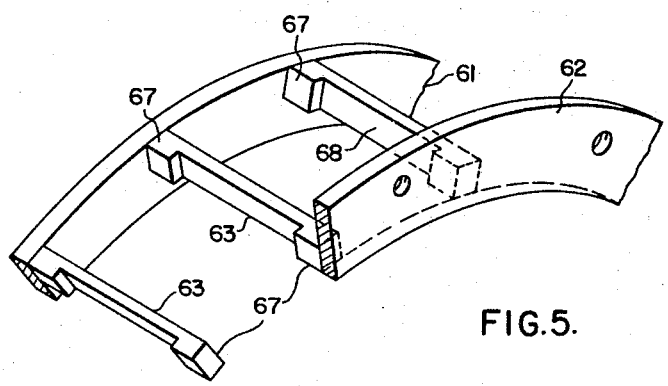
FIG. 5 is a fragmentary isometric view, on a larger scale, illustrating several of the torsionally flexible members and associated structure.

However, during operation, the exhaust housing structure 46 is subject to large pressure loads due to the exhaust gases within the chamber 56. Some of this pressure loading is transmitted to the outer shell structure 13 by the flange connection 54. The remainder of the pressure loads, as well as a part of the weight load of the exhaust housing, is transmitted to the inner shell structure 19 by a connecting structure including a ring member 61 disposed in a plane normal to the rotational axis of the rotor 29 and attached to the end wall portion 57 of the inner shell structure 19, a ring member 62 disposed in a plane normal to the rotational axis of the rotor structure 29 and a circumferential array of axially elongated connecting members 63. The ring 62 is disposed radially inwardly of the frustoconical wall 51 of the exhaust housing and is attached to an annular flange 64 provided in the wall portion 51 by an annular array of suitable fastening means, such as the bolts 66. The rings 61 and 62 are spaced with respect to each other in axial direction but are firmly connected to each other about their peripheries by the circumferential array of connecting members 63, as also shown in FIGS. 3 and 5. The connecting members 63 are rigidly attached at their opposite ends 67 to the ring members 61 and 62 in any suitable manner, for example by welding, and are of generally rectangular cross-sectional shape.

Figure 4:
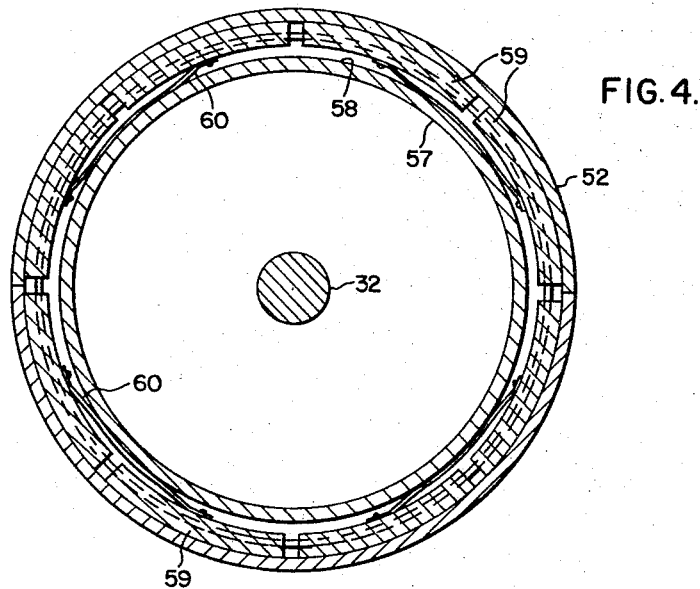
FIG. 4 is a cross-sectional view taken on line IV—IV of FIG. 1.

The connecting members 63 are substantially identical to each other, and hence only one will be described. As best illustrated in FIG. 4, the connecting member 63 has an active central portion 68 of thin and preferably rectangular shape, with its major transverse axis disposed in a radial plane R extending through the rotational axis of the rotor spindle structure 29 and its minor transverse axis disposed in a plane P parallel to the rotational axis of the rotor spindle 29 and in spaced relation therewith. Accordingly, the connecting structure 61, 62, 63 has a high degree of torsional flexibility, i.e. flexibility in circumferential direction, yet a high degree of stiffness in the radial and axial directions.

Thus, little additional torsional restraint is imposed on the inner shell 19. Therefore the tangential struts 40 are free to operate as required without buckling or undue stress. Since the connecting structure 61, 62, 63 is stiff or unyielding in the axial and radial directions, it is effective to transmit the fluid pressure loads imposed upon the exhaust housing 46, as well as a part of the weight load thereof, to the inner shell structure 19.

Accordingly, it will now be seen that there is provided an arrangement for connecting the exhaust housing 46 to the inner and outer shell structure 19 and 13 respectively, which shells are subject to expansion by the hot motive fluids in operation, in which leakage of such fluid to the atmosphere through the juxtaposed portions of the shell structure and the exhaust housing 46 is minimized while imposing little torsional restraint upon the shell structure so that the inner shell 19 is free to be positioned by the tangential struts 40 without distortion.

It will further be noted that the exhaust housing is rigidly and unyieldingly attached to one of the shells 13 and 19, while connected to the other of the shells 13 and 19 in a manner permitting rotation thereof, as described above.

Although the connecting members 63 have been shown and described as having a thin rectangular cross-section to impart the torsional flexibility, it will now be apparent that the cross-sectional shape is not critical and may be modified in any desired manner to attain similar results.

For facility of manufacture and assembly as well as service in the field, the housing 46 and shell structure 13, 19, 12 and 18, may be divided into upper and lower halves, in a manner well known in the art. Accordingly, the exhaust housing structure 46, as illustrated, is provided with mating lower and upper flanges 71 and 72 extending in the axial direction and disposed in a horizontal plane extending through the axis of rotation of the rotor spindle structure 29. The remainder of the above mentioned shell structure may also be formed on the same manner and flanged in any suitable manner (not shown) to permit such ease of assembly and disassembly.

While the invention has been shown in one form, it will be obvious to those skilled in the art that it is not so limited, but is susceptible of various other changes and modifications without departing from the spirit thereof.

I claim as my invention:

1. In an elastic fluid utilizing machine comprising:
an outer tubular shell structure,
an inner tubular shell structure disposed concentrically with said outer shell and jointly therewith defining an annular flow passageway for elastic fluid,
a rotor structure disposed within said outer shell structure and having an annular array of blades disposed in said flow passageway,
means for rotatably supporting said rotor about its central axis comprising a bearing and a bearing retainer disposed within said inner shell,
means for supporting said bearing retainer including a plurality of struts connected to said inner shell in a tangential manner and to said outer shell structure,
said struts extending across said flow passageway and being subject to thermal change in length during operation,
said struts being effective to apply torsional forces tending to rotate said inner shell and said bearing retainer to accommodate said thermal change,
the improvement comprising,
a housing disposed in communication with said flow passageway,
said housing having a first annular wall and a second annular wall,
means connecting said first wall to one of said shells, and
means connecting said second wall to the other of said shells,
one of said connecting means having a high degree of torsional flexibility thereby to impose a minimal torsional restraint on said struts, and having a high degree of rigidity in axial and radial directions, thereby to transmit the fluid pressure loading forces imposed on the housing to the associated shell.

2. The structure recited in claim 1, in which
the one connecting means includes an annular array of circumferentially spaced members extending in axial direction and having one end connected to the associated shell and the other end connected to the associated wall.

3. The structure recited in claim 1 wherein
the wall and shell associated with the one connecting means are provided with annular sliding seal structure to minimize leakage of motive fluid therepast without imposing substantially torsional restraint on the struts.

4. The structure recited in claim 1, in which
the one connecting means includes an annular array of circumferentially spaced members elongated in the axial direction and having one end rigidly connected to the associated shell and the opposite end rigidly connected to the associated shell, and
the associated shell and wall are provided with an annular array of slidable seal members for minimizing leakage of motive fluid therepast without imposing substantial torsional restraint on the struts.

5. In an elastic fluid utilizing machine comprising:
inner and outer tubular shell structure disposed in radially spaced relation with each other and jointly defining an annular flow passage for elastic fluid,
a rotor structure encompassed by said outer shell structure and having an annular array of blades disposed in said flow passage,
means for supporting said rotor for rotation about its central axis comprising a bearing disposed downstream of said blades, with respect to flow of elastic fluid, and an annular retainer for said bearing encompassed by said inner shell,
means carried by said inner shell for supporting said bearing retainer, and
means including a plurality of struts connected to said inner shell in a tangential manner and to said outer shell,
said struts extending across said flow passageway downstream of said blades and being subject to thermal change in length during operation,
said struts being effective to apply torsional forces tending to rotate said inner shell to accommodate said thermal change,
the improvement comprising
a housing disposed in communication with said flow passageway and having a fluid exhaust outlet,
said housing having a first annular wall rigidly connected to said outer shell,
said housing having a second annular wall disposed in juxtaposition with said inner shell, and
means providing a flexible connection between said second wall and said inner shell,
said flexible connection means having a high degree of torsional flexibility thereby to impose a minimal torsional restraint on said struts, and having a high degree of rigidity in axial and radial directions, thereby to transmit the fluid pressure loading forces imposed on the housing to the inner shell.

6. The structure recited in claim 5, in which said flexible connection means includes an annular array of circumferentially spaced members elongated in axial direction and having one end connected to the inner shell and the opposite end connected to the second wall.

7. The structure recited in claim 5, and further including
annular slidable seal ring structure interposed between the juxtaposed portions of the inner shell and the second wall.

8. The structure recited in claim 5, in which said flexible connection means includes an annular array of circumferentially spaced members disposed parallel to the axis and having one end connected to the inner shell and the opposite end connected to the second wall, and further including,
annular slidable seal ring structure interposed between the juxtaposed portions of the inner shell and the second wall.

References Cited by the Examiner

UNITED STATES PATENTS

| 2,616,662 | 11/1952 | Mierley | 253—39 |
| 2,724,621 | 11/1955 | Kenney | 253—39 |

FOREIGN PATENTS 1,193,594  4/1959  France.

MARTIN P. SCHWADRON, *Primary Examiner.*
EVERETT A. POWELL, *Examiner.*